(12) United States Patent
Harper

(10) Patent No.: US 7,775,391 B2
(45) Date of Patent: *Aug. 17, 2010

(54) CONTAINER FOR HOLDING A CRYOGENIC FUEL

(75) Inventor: Gregory C. Harper, Vancouver (CA)

(73) Assignee: Westport Power Inc., Vancouver, BC (CA)

( * ) Notice: Subject to any disclaimer, the term of this patent is extended or adjusted under 35 U.S.C. 154(b) by 325 days.

This patent is subject to a terminal disclaimer.

(21) Appl. No.: 11/277,071

(22) Filed: Mar. 21, 2006

(65) Prior Publication Data
US 2006/0236789 A1 Oct. 26, 2006

Related U.S. Application Data

(63) Continuation of application No. PCT/CA2004/001685, filed on Sep. 15, 2004.

(30) Foreign Application Priority Data
Sep. 23, 2003 (CA) .................................. 2441775

(51) Int. Cl.
*F17C 1/00* (2006.01)
(52) U.S. Cl. ................. 220/560.1; 220/560.04; 220/901; 220/62.18
(58) Field of Classification Search ............ 220/560.04, 220/560.09, 560.1, 560.12, 901, 560.11, 220/62.18, 560.01
See application file for complete search history.

(56) References Cited

U.S. PATENT DOCUMENTS

| 1,979,221 A | 10/1934 | Dana |
| 2,998,708 A * | 9/1961 | Skinner ............... 62/45.1 |
| 3,119,238 A | 1/1964 | Chamberlain et al. |
| 3,132,762 A | 5/1964 | Gabarro et al. |
| 3,156,100 A | 11/1964 | Haettinger et al. |
| 3,217,920 A * | 11/1965 | Holben ............... 220/560.1 |
| 3,273,740 A | 9/1966 | Herrenschmidt |

(Continued)

FOREIGN PATENT DOCUMENTS

CN 2515507 Y 10/2002

(Continued)

OTHER PUBLICATIONS

First Office Action, English Translation, pp. 1-10.

*Primary Examiner*—Anthony Stashick
*Assistant Examiner*—Christopher B McKinley
(74) *Attorney, Agent, or Firm*—McAndrews, Held & Malloy, Ltd.

(57) ABSTRACT

A double-walled vacuum insulated container for holding a cryogenic fluid comprises a support system for the inner vessel that comprises at least one elongated metallic conduit that penetrates the walls of the outer vessel and the inner vessel. The conduit itself provides support in an axial direction parallel to a horizontal axis and at least two non-metallic members provide support in a radial direction from the horizontal axis. By requiring the conduit to support only axial loads, its wall thickness can be reduced, thereby reducing heat transfer through the conduit. The non-metallic members that provide support in the radial direction can be made from composite materials selected for structural strength as well as low thermal conductivity, resulting in a container with improved overall thermal insulation to reduce heat leak and allow longer holding times.

41 Claims, 9 Drawing Sheets

U.S. PATENT DOCUMENTS

| | | | |
|---|---|---|---|
| 3,339,515 A | 9/1967 | Reed | |
| 3,341,215 A | 9/1967 | Spector | |
| 3,425,583 A | 2/1969 | Bridges | |
| 3,425,585 A | 2/1969 | Latham | |
| 3,438,115 A * | 4/1969 | Zeunik et al. | 29/419.2 |
| 3,446,388 A * | 5/1969 | Greenberg | 220/562 |
| 3,481,505 A * | 12/1969 | Nason et al. | 220/560.1 |
| 3,487,971 A | 1/1970 | Kirgis et al. | |
| 3,698,200 A * | 10/1972 | Johnson et al. | 62/50.2 |
| 3,705,498 A | 12/1972 | DeHaan | |
| 3,782,128 A | 1/1974 | Hampton et al. | |
| 3,905,508 A * | 9/1975 | Hibl et al. | 220/476 |
| 3,948,411 A | 4/1976 | Conte | |
| 4,000,826 A | 1/1977 | Rogers | |
| 4,038,832 A | 8/1977 | Lutgen et al. | |
| 4,098,426 A | 7/1978 | Gerhard | |
| 4,292,062 A | 9/1981 | Dinulescu et al. | |
| 4,318,056 A * | 3/1982 | Sze | 372/57 |
| 4,343,413 A | 8/1982 | Chatzipetros et al. | |
| 4,394,929 A | 7/1983 | Patel et al. | |
| 4,472,946 A | 9/1984 | Zwick | |
| 4,487,332 A | 12/1984 | Huang | |
| 4,496,073 A | 1/1985 | Silver et al. | |
| H80 H | 7/1986 | Lewis | |
| 4,625,753 A | 12/1986 | Gustafson | |
| 4,674,289 A | 6/1987 | Andonian | |
| 4,680,935 A * | 7/1987 | Murai | 62/45.1 |
| 4,718,239 A | 1/1988 | Nowobilski et al. | |
| 4,877,153 A * | 10/1989 | Varghese et al. | 220/560.1 |
| 4,899,546 A | 2/1990 | Eigenbrod | |
| 4,918,927 A * | 4/1990 | Eigenbrod | 62/45.1 |
| 4,976,110 A | 12/1990 | Reid | |
| 5,012,948 A * | 5/1991 | Van Den Bergh | 220/560.05 |
| 5,085,343 A | 2/1992 | Scarr | |
| 5,386,699 A | 2/1995 | Myers et al. | |
| 5,533,340 A * | 7/1996 | Shama et al. | 62/45.1 |
| 5,651,473 A * | 7/1997 | Preston et al. | 220/560.1 |
| 5,651,474 A | 7/1997 | Callaghan et al. | |
| 5,954,101 A | 9/1999 | Drube et al. | |
| 6,047,747 A * | 4/2000 | Bowen et al. | 141/231 |
| 6,843,247 B2 * | 1/2005 | Frye et al. | 128/201.21 |
| 7,344,045 B2 * | 3/2008 | Harper et al. | 220/560.09 |
| 2002/0011491 A1 | 1/2002 | Rosen | |

FOREIGN PATENT DOCUMENTS

| | | |
|---|---|---|
| CN | 2528733 Y | 1/2003 |
| DE | 10249250 A1 | 6/2004 |
| GB | 2398115 A | 8/2004 |

* cited by examiner

CONTAINER FOR HOLDING A CRYOGENIC FUEL

CROSS-REFERENCE TO RELATED APPLICATION(S)

This application is a continuation of International Application No. PCT/CA2004/001685, having and international filing date of Sep. 15, 2004, entitled "Container For Holding A Cryogenic Fuel". International Application No. PCT/CA2004/001685 claimed priority benefits, in turn, from Canadian Patent Application No. 2,441,775 filed Sep. 23, 2003. International Application No. PCT/CA2004/001685 is hereby incorporated by reference herein in its entirety.

FIELD OF THE INVENTION

The present invention relates to a container for holding a cryogenic fluid. More particularly, this invention relates to a heat insulated double-walled container with a combined support and fluid conduit structure for suspending an inner vessel within an outer vessel, for reducing heat transfer and allowing longer holding times.

BACKGROUND OF THE INVENTION

Developments in combustion engine technology have shown that compression ignition engines, frequently referred to as diesel-cycle engines, can be fuelled by gaseous fuels instead of diesel without sacrifices in performance or efficiency. Examples of such fuels include natural gas, methane, propane, ethane, gaseous combustible hydrocarbon derivatives and hydrogen. Substituting diesel with such gaseous fuels generally results in cost, availability and emissions benefits over diesel.

However, one challenge in using gaseous fuels for such applications is that the energy density of gaseous fuels is not as high as conventional liquid fuels. This is an important consideration, for example, with gaseous fuel systems employed for vehicular applications, because fuel storage space on a vehicle is limited. For gaseous-fuelled vehicles to be attractive versus conventional diesel-fuelled vehicles, the on-board fuel storage system should not diminish the vehicle's transport capacity.

To increase the energy density of a gaseous fuel, it can be stored at high pressure. To contain a gas at high pressure, a pressure vessel rated for a specified maximum holding pressure must be used. For gaseous fuels, compared to a compressed gas, higher energy densities can be achieved at lower storage pressures with a liquefied gas. As a result, the fuel tank does not need to be rated for as high a pressure, which can reduce the weight of the fuel tank.

Accordingly, a preferred method of increasing the energy density of a gaseous fuel is to store it in a liquefied state at cryogenic temperatures. A liquefied gas stored at a cryogenic temperature is referred to herein as a cryogenic fluid and a gaseous fuel stored in a liquefied state at a cryogenic temperature is referred to herein generally as a "cryogenic fuel".

For the purposes of this application, cryogenic fuels include liquefied gaseous fuels that boil at temperatures at or below −100° C. under atmospheric pressures. An example of such fuel is liquefied natural gas, commonly known as "LNG".

In the present disclosure LNG is referred to as a preferred example of a cryogenic fuel because of the vast proven reserves of natural gas in many of the potential markets around the world, the affordability of natural gas, and the already existing infrastructure for natural gas, which is continuing to expand in breadth and capacity.

However, people skilled in the technology would understand that the present storage container can be employed to hold other cold or cryogenic fuels or liquefied gases generally. By way of example, the disclosed storage container could be employed to accommodate other hydrocarbons such as methane, ethane, propane and hydrocarbon derivatives or non-organic fuels such as hydrogen. Furthermore, the container that is the subject of this disclosure can also be used to hold other liquefied gases at cryogenic temperatures, such as helium, nitrogen and oxygen.

However, one of the challenges of storing liquefied gas at cryogenic temperatures is reducing heat transfer into the cryogen space. As the temperature of the liquid increases, the vapour pressure rises inside the storage container. Cryogenic storage containers are normally equipped with a pressure relief venting system to prevent over-pressurization of the storage container. Excessive heat transfer into a cryogen space can result in fuel wastage through venting. When the liquefied gas is a fuel, it is also undesirable to routinely release fuel into the environment. With natural gas used as an example, methane, a major component of natural gas, is a greenhouse gas.

Cryogenic storage containers commonly use a double walled construction with an inner vessel, which holds the liquefied gas, suspended inside an outer vessel. A vacuum applied to the space between the inner vessel and the outer vessel minimizes conductive and convective heat transfer. It is also known to wrap sheets of a super-insulating material around the inner vessel to minimize radiant heat transfer. However, the structural supports for the inner vessel and any piping between the inner vessel and outside environment, all provide heat conduction paths and the transfer of heat energy to the liquefied gas in the cryogen space from the outside environment is commonly known as "heat leak".

As long as there are structural supports for the inner vessel and there are pipes or conduits that penetrate through the insulated space, some heat leak will occur. "Holding time" is defined herein as the time span that a cryogen can be held inside the storage container before heat leak into the cryogen space causes the vapour pressure to rise to a level at which the pressure relief valve opens. Accordingly, holding times can be extended without the need to vent excess vapor pressure if heat leak can be reduced.

U.S. Pat. No. 5,651,473 discloses a support system for cryogenic vessels that is representative of the current state of the art. As shown in FIG. 1 and the enlarged view of FIG. 1A, an arrangement is provided for supporting inner vessel 102 within outer vessel 104, while also providing an opening through which conduits can be inserted so that fluid can flow into and out of the cryogen space.

Prior art assembly 110 consists of manifold block 112 that supports inner cylindrical member 114. Collar 118 is fixed to the opposite end of member 114 to define interior space 116 (see FIG. 1A). A passageway can be provided in block 112 or cylindrical member 114 to communicate space 116 with insulation chamber 106 so that when a vacuum is created in insulation chamber 106 it will also be created in space 116. Collar 118 supports a second cylindrical member 123 that is disposed over and is coaxially aligned with member 114. The space 125 between cylindrical members 114 and 123 also communicates with insulation chamber 106. A plurality of pipes 122, 126, and 130 extend between collar 118 and manifold block 112. These pipes are provided with a bend, sometimes referred to as a "joggle", which provides a trap to create a liquid/vapor interface and allows for differential thermal expansion or contraction between the pipes and cylindrical member 114. Pipe 122 is connected to liquid fill line 124, pipe 126 is connected to liquid delivery line 128, and pipe 130 is connected to vent 132.

A disadvantage of this system is that cylindrical member 114 and the pipes are both metallic thermal conductors and both penetrate the insulated space, providing a plurality of heat paths through which heat can be introduced into the cryogen space. Cylindrical member 114 is metallic so that it can be welded and sealed to manifold block 112 and collar 118, but less heat transfer could be achieved if a structural material with a lower thermal conductivity could be employed.

In addition, cylindrical member 114 provides support in both the radial and axial directions, so the wall thickness of cylindrical member 114 must be designed to provide adequate strength in all directions, which is an important consideration in mobile applications because the momentum of the inner vessel and the cryogenic fluid contained therein is affected by the vehicle's acceleration, deceleration and changes in direction. Consequently, a further disadvantage of the prior art arrangement of FIGS. 1 and 1A is that a thicker wall for cylindrical member 114 correlates to higher thermal conductivity because the cross-sectional area through which heat transfer can occur is greater.

SUMMARY OF THE INVENTION

A container for holding a cryogenic fluid is disclosed comprising:
a. an inner vessel defining a cryogen space and having a horizontal axis;
b. an outer vessel surrounding the inner vessel, defining an evacuatable space between the outer vessel and the inner vessel;
c. a structure for supporting the inner vessel within the outer vessel, the structure comprising:
   an elongated metallic tubular support attached at a first point to an inner vessel support bracket associated with the inner vessel, and attached at a second point to an outer vessel support bracket for the outer vessel, the metallic tubular support capable of supporting substantially all loads acting on the inner vessel in a direction parallel to the horizontal axis;
   a plurality of non-metallic radial supports spanning between the inner vessel and the outer vessel, each one of the radial supports providing a bearing surface associated with respective opposite facing surfaces associated with the inner vessel and the outer vessel for transferring radial loads transverse to the horizontal axis from the inner vessel to the outer vessel, wherein the bearing surface associated with at least one of the opposite facing surfaces for each radial support allows movement in the direction parallel to the horizontal axis.

The plurality of non-metallic radial supports can comprise a first non-metallic radial support associated with a first side of the inner vessel that is intersected by the horizontal axis, and a second non-metallic radial support associated with a second side of the inner vessel, opposite to the first side.

An advantage of employing separate axial and radial supports, and employing radial supports that do not restrict movement in the axial direction is that this simplifies the structure of the elongated metallic tubular support that provides support in the axial direction. The container can be designed so that the only rigid connection between the inner vessel and the outer vessel in the axial direction is the elongated metallic tubular support. With this feature, the elongated metallic tubular support does not need to be designed to accommodate differences between the thermal expansion and contraction in the axial direction between the axial and radial structural support members.

The walls of respective cup-shaped inner support structures projecting into the cryogen space can provide the opposite facing surfaces associated with the first and second sides of the inner vessel. A bottom to the cup-shaped inner support structures seals the cryogen space within the inner vessel from the surrounding evacuatable space. Walls of opposite cup-shaped outer supports can provide the opposite facing surfaces associated with the outer vessel structures projecting from the outer vessel. The open end of the cup-shaped outer support structure is open towards the inner vessel and is aligned with an opposite one of the cup-shaped inner support structures. A bottom to the cup-shaped outer support structures or the outer vessel itself seals the evacuatable space from the environment surrounding the outer vessel. In this preferred embodiment, the first and second non-metallic radial supports each comprise a cylindrical member with a first end disposed in a respective one of the cup-shaped inner support structures and a second end disposed in a respective one of the cup-shaped outer vessel support structures. The cylindrical member can be hollow so that it is tubular in shape.

The support structure for the elongated metallic tubular support and one of the non-metallic radial supports can be shared, for example, if the elongated metallic tubular support extends through the non-metallic cylindrical member. With this arrangement the inner vessel support bracket can be integrated with the cup-shaped inner support structure and the outer vessel support bracket can be integrated with the cup-shaped outer support structure.

In preferred embodiments the first and second non-metallic radial supports are made from a composite material comprising fibres disposed within a plastic matrix. Those skilled in the knowledge of composite materials will understand that it is possible to choose from many types of fibres and plastics and that the choice of materials determines the properties of the composite material. In the present case, two important properties for the composite material that is employed for providing radial support for the inner vessel are strength and thermal conductivity under the anticipated operating conditions. That is, an objective of using a non-metallic composite material is to reduce heat leak into the cryogen space. Accordingly, it is desirable for the composite material to have a lower thermal conductivity than ferrous support members used in conventional containers. Even though the heat transfer coefficient of a composite is less than ferrous materials, the overall thermal conductivity can be greater if the composite material is not as strong and a composite structural member with a larger heat conducting cross-sectional area is needed. Therefore, a combination of strength and a low heat transfer coefficient is needed to achieve the desired result and the non-metallic radial supports preferably have a thermal conductivity that is less than a substitute radial support made from a ferrous material with at least the same structural strength.

Composite materials for the non-metallic radial support for the inner vessel can comprise fibres selected from the group consisting of glass, carbon, synthetic fibres made from a resin, and quartz. An example of a synthetic fibre made from a resin would be aramid fibres such as the material sold by E.I. Dupont de Nemours and Company under the trade name Kevlar®. An epoxy resin can be employed to provide the plastic matrix. The epoxy resin preferably has a cure temperature that is greater than 175 degrees Celsius (about 350 degrees Fahrenheit) so that the non-metallic members will not be damaged when the container is heated to create an insulating vacuum in the evacuatable space between the inner and outer vessels. In other embodiments the plastic matrix can comprise bismaleimide or a thermoplastic selected from the group consisting of polyetheretherketone and polyphenylene sulfide.

While randomly oriented fibres can be employed, because the radial support structures require strength principally in the radial direction, fibres with controlled orientation are preferably employed for improved strength. For example, woven fibre mats or continuous oriented strands can be employed so that at least some of the fibres are aligned to provide more strength in the radial direction.

Materials disposed in a vacuum can release gaseous elements and because the non-metallic radial supports are located within the evacuatable space, materials with low outgassing properties are preferred. One measure of outgassing is total mass loss ("TMV") and a TMV of less than 1% is preferred. Another measure of outgassing is collected volatile condensable material ("CVCM") and a CVCM less than 0.1% is preferred.

Another way to reduce heat leak into the cryogen space is to increase the length of the heat transfer path between the outside environment and the cryogen space. With the disclosed arrangement, the elongated metallic tubular support can have a length between the first and second points where it is supported that provides a heat path between the inner vessel and the outer vessel that is longer than the radial spacing between the inner vessel and the outer vessel.

In another preferred arrangement, the first and second non-metallic radial supports each comprise a hub that provides the bearing surfaces that cooperate with the respective opposite facing surfaces associated with the first and second sides of the inner vessel and a plurality of straps extend from the hub to respective attachment points located on the interior of the outer vessel.

The straps extend in a direction that provides radial support to the inner vessel while providing a heat transfer path between the inner vessel and the outer vessel that is longer than the radial spacing between the inner vessel and the outer vessel where the horizontal axis intersects the inner and outer vessels. As mentioned above, increasing the length of the heat transfer path reduces the heat leak into the cryogen space. With the present arrangement, the straps are required to provide support only in the radial direction since axial support is provided by the elongated metallic tubular support, and this enables the size of the straps to be reduced compared to support structures that employ support structures that provide both axial and radial support; the reduced size of the straps also helps to reduce heat leak into the cryogen space.

The straps can extend in a direction that is substantially tangential to the surface of the inner vessel. Because the straps are designed to provide support in the radial direction the straps extend in a direction that is substantially perpendicular to the horizontal axis. For example, if the supported end of the inner vessel is dome-shaped and the point where the radial support is provided in along the center axis of the domed end, the straps can be both perpendicular to the container's axis and tangential to the surface of the inner vessel.

In a preferred embodiment, the non-metallic hub has a hollow axis and the elongated metallic tubular support extends through the hollow axis. With this arrangement, the support structure for the hub can be integrated with the support structure for the elongated metallic tubular member.

The straps can be metallic or non-metallic. If the straps are metallic they can be welded to the points where they are attached to the inner surface of the outer vessel. A metallic collar disposed around the hub can provide a sliding joint between the metallic straps and the non-metallic hub. As with all embodiments, a sliding joint is preferred so that the inner vessel is free to move in the axial direction in response to expansion or contraction of the elongated metallic tubular support. That is, the radial support members preferably do not provide any significant resistance to movement of the inner vessel in the axial direction. The metallic straps can be welded to the metallic collar.

If the straps are non-metallic, a collar can still be used to provide a sliding joint between the straps and the hub. In an alternative arrangement, the straps can be fixedly attached to the hub and axial movement of the inner vessel can be provided by sliding movement between the hub and the opposite facing structure associated with the inner vessel. The non-metallic straps can be attached to the outer vessel by known attachment methods, such as bolts or rivets.

In yet another embodiment the hub can be metallic and welded to the inner vessel. In this arrangement the first and second non-metallic radial supports comprise a plurality of straps and the bearing surfaces of the first and second non-metallic radial supports are provided by a collar that cooperates with a respective opposite facing surface of the metallic hub. Each one of the plurality of straps can have one end attached to the collar and another end attached to the outer vessel.

Heat leak into the cryogen space can be reduced by reducing the number of components that span the vacuum insulated space. Conventional inner vessel support systems typically provide a support structure in addition to piping to allow fluid flow into or out of the cryogen space. With the present embodiments the elongated metallic tubular support is also capable of serving as a conduit through which cryogenic fluid can flow into or out of the cryogen space. The conduit preferably terminates with an open end near the top of the cryogen space so that the conduit can be employed to fill or vent the cryogen space. By enabling the conduit to have a plurality of functions this also reduces the number of pipes and the number of heat transfer paths into the cryogen space.

The elongated metallic tubular support can also be used to support a level sensor or provide a passage for wiring connected to instrumentation disposed within the cryogen space. If a pump is to be disposed with an inlet inside the cryogen space, the elongated metallic tubular support can also serve as a sleeve for supporting the pump.

To further lengthen the heat transfer path through the elongated metallic tubular support it can be made with a double walled construction. In a preferred arrangement such a double walled elongated metallic tubular support comprises:

an inner tubular wall spaced apart from an outer tubular wall wherein the space between the inner and outer tubular walls is evacuatable together with the evacuatable space between the outer vessel and the inner vessel;

a distal end disposed within the inner vessel with the inner and outer tubular walls joined together and sealed at or near the distal end whereby cryogenic fluid from within the cryogen space is prevented from flowing into the space between the outer and inner tubular walls; and a proximal end associated with the inner vessel and the outer vessel, whereby the inner tubular wall is structurally attached to the inner vessel and the outer tubular wall is structurally attached to the outer vessel.

For strength reasons, the inner vessel preferably has a substantially cylindrical shape with domed ends. For mounting on a vehicle as a fuel tank, the longitudinal axis of the cylinder is typically aligned with the horizontal axis.

A preferred embodiment of a container for holding a cryogenic fluid comprises the following features:
an inner vessel defining a cryogen space and having a horizontal axis;
an outer vessel surrounding the inner vessel, defining an evacuatable space between the outer vessel and the inner vessel;
a structure for supporting the inner vessel, the structure comprising:
i. an elongated metallic double walled tubular support capable of carrying substantially all loads acting in a direction parallel to the horizontal axis between the inner vessel and the outer vessel, the elongated metallic double walled tubular support comprising:
an inner wall spaced apart from an outer wall wherein the space between the inner and outer walls is evacuatable together with the evacuatable space between the outer vessel and the inner vessel;
a distal end disposed within the inner vessel with the inner and outer walls joined together and sealed at or near the distal end whereby cryogenic fluid from within the cryogen space is prevented from flowing into the space between the outer and inner walls;
a proximal end associated with the inner vessel and the outer vessel, whereby the inner wall is structurally attached to the inner vessel and the outer wall is structurally attached to the outer vessel;
ii. first and second radial supports associated with opposite first and second sides of the inner vessel, the opposite first and second sides being intersected by the horizontal axis, the radial supports capable of carrying substantially all loads acting in a radial direction in relation to the horizontal axis, each one of the first and second radial supports comprising at least one non-metallic member extending between the inner vessel and the outer vessel.

The container can be shaped to fit the location where it will be used and to provide the necessary storage volume for its intended purpose. Spherical shapes are strong structurally and provide the lowest surface area for a given volume. However, a more elongated shape can provide more storage volume for deployment in the spaces available, for example, on a vehicle for use as a fuel tank. In preferred embodiments, the inner vessel is elongated in a direction parallel to the horizontal axis and the inner vessel is supported in the axial direction parallel to the horizontal axis by the elongated metallic tubular support.

A method is provided for supporting an inner vessel that defines a cryogen space within an outer vessel. The method transfers axial and radial loads between the inner vessel and the outer vessel and reduces heat leak into the cryogen space. The method comprises:
evacuating a sealed space between the inner vessel and the outer vessel;
transferring substantially all loads in an axial direction through an elongated metallic tube; and
transferring substantially all loads in a radial direction through at least two non-metallic structural members that have a lower heat transfer coefficient than the elongated metallic tube.

The method can further comprising wrapping the inner vessel with a super insulating material to reduce radiant heat transfer.

As explained with reference to the preferred characteristics of the radial support structure, the method further comprises allowing the inner vessel to move in the axial direction relative to the outer vessel, with movement in this direction restrained substantially only by the elongated metallic tube. That is, the inner vessel is free to move relative to the outer vessel when the elongated metallic tube expands or contracts in length. To allow such axial movement, the method comprises allowing the non-metallic structural members to move in the axial direction relative to at least one of the outer vessel and the inner vessel.

The method further comprises using the elongated metallic tube as a conduit through which cryogenic fluid can flow into or out of the cryogen space, so that it functions as both a structural member and a pipe. The method can further comprise reducing the number of heat conductive structures penetrating through the evacuatable sealed space by using the elongated metallic tube as a multi-functional conduit that is usable as a fill tube for introducing a cryogenic fluid into the cryogen space, and as a vent tube for venting vapour from the cryogenic space.

If the container is to have a pump that has an inlet disposed within the cryogen space, the method can further comprise reducing the number of heat conductive structures penetrating through the evacuated sealed space by also using the elongated metallic tube as a support structure for the pump. The method can further comprise using the elongated metallic tube as a support structure for a level sensor or for a passage for wiring for instrumentation disposed within the cryogen space.

A preferred application for the method is for storing a gaseous fuel on board a vehicle with a quantity of the fuel held in the cryogen space in a liquefied state. The capability of this method to be used by an apparatus that is operable on board a vehicle is significant because the axial and radial loads applied to the support structure can be much more significant compared to the loads that are imposed on a stationary container of similar size. The acceleration, deceleration, and changes in direction that occur in a mobile installation can generate momentum in both the axial and radial directions. The horizontal alignment also results in significant loading in the radial direction, compared to a vertically oriented stationary container where most of the load is carried along the vertical axis.

DETAILED DESCRIPTION OF PREFERRED EMBODIMENT(S)

Figure 2:
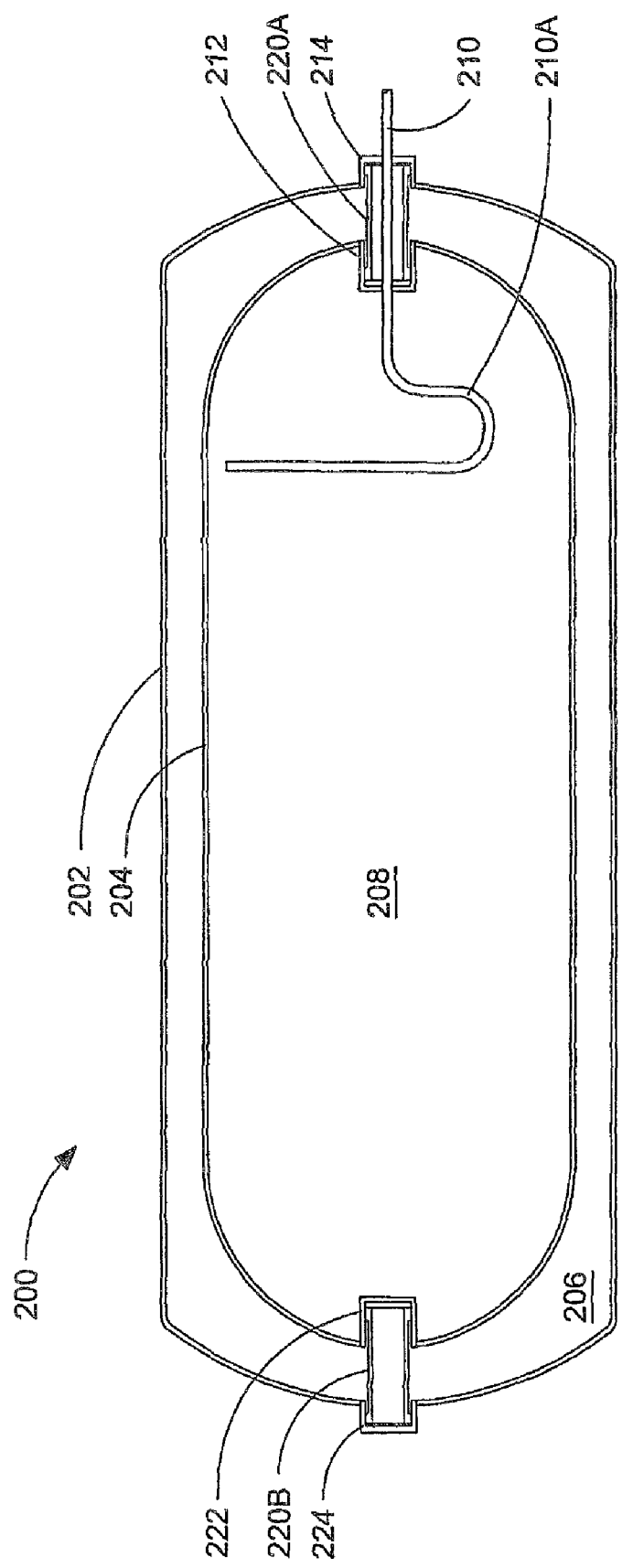
FIGS. 2 and 2A show cross-sectional views of a preferred embodiment of a support system for suspending an inner vessel within an outer vessel with separate support structures for handling axial and radial loads. In this embodiment, the radial loads are transferred through tubular non-metallic members.

FIG. 2 is a cross-sectional view of a preferred embodiment of a heat insulated double-walled container 200 for holding a cryogenic fluid. Outer vessel 202 surrounds, and is spaced apart from, inner vessel 204, defining evacuatable space 206 therebetween. Inner vessel 204 also defines the general boundaries of cryogen space 208. In the illustrated embodiment, inner vessel 204 has a cylindrical body with dome-shaped ends. This shape conforms with the general shape of conventional fuel tanks attached to heavy-duty trucks. The invention relates to the support system for inner vessel 204 and other shapes could be employed for the inner vessel with the same support system. For example, other shapes such as a sphere or an elliptical cross-section may be dictated by the application and the space available for mounting the container. For strength reasons, rounded shapes are preferred compared to shapes with sharp or square corners.

Figure 2A:
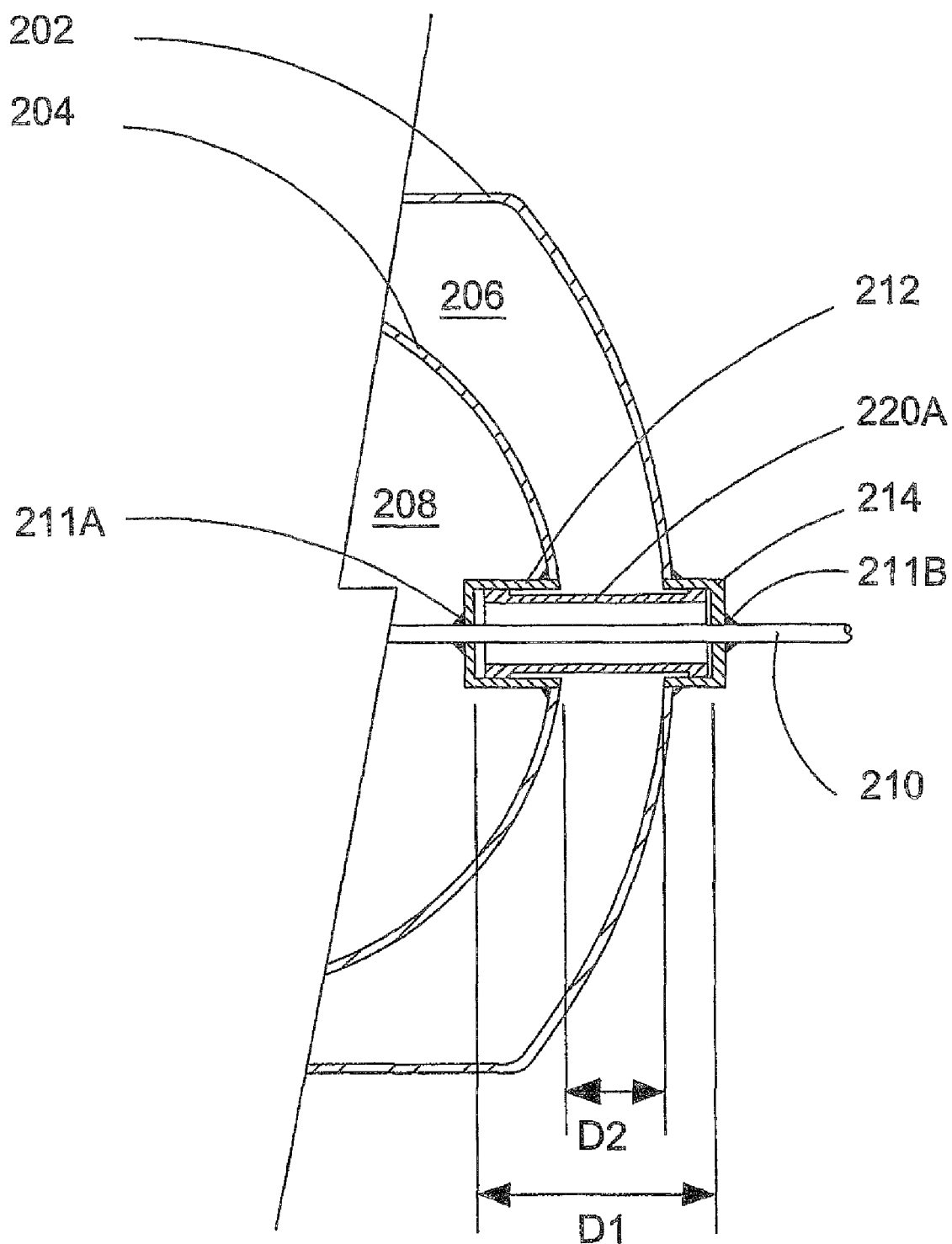

To support inner vessel 204 in the axial direction, the structure for supporting inner vessel 204 comprises an elongated metallic tubular support that is attached at a first point to an inner vessel support bracket associated with the inner vessel and attached at a second point to an outer vessel support bracket. In the embodiment of FIG. 2, conduit 210 serves as the elongated metallic tubular support. Conduit 210 is attached at a first point to inner vessel support bracket 212, as indicated in FIG. 2A by weld symbols 211A. Conduit 210 is also attached at a second point to outer vessel support bracket 214, as indicated by weld symbols 211B. Accordingly, conduit 210 provides a rigid support member fixedly attached to both inner vessel 204 and outer vessel 202, and is sized to be capable of providing all of the axial support needed by inner vessel 204 in the direction parallel to the horizontal longitudinal axis.

As shown in FIG. 2A, D1 is the distance between the first point where conduit 210 is attached to inner vessel support bracket 212 and the second point where it is attached to outer vessel support bracket 214. Distance D2 is the radial spacing between outer vessel 202 and inner vessel 204 along the axis of conduit 210. Conduit 210 is a thermal conductor so the support system is preferably designed as shown in FIG. 2A so that distance D1 is longer than distance D2 to increase the length of the heat transfer path and thereby reduce heat transfer.

With reference again to FIG. 2, conduit 210 has an open end disposed within the upper region of cryogen space 208, which is normally filled with vapor. Configured in this way, conduit 210 can be used as a fill line and/or a vent line. In addition to venting cryogen space 208 when the pressure exceeds the set point of the pressure relief valve, conduit 210 can be used to vent cryogen space 208 prior to refilling it with liquefied gas or when the container is emptied for servicing. Valves (not shown) can be provided outside container 200 to allow this multi-functionality thereby eliminating the need for a plurality of separate single purpose conduits as used in the prior art arrangement shown in FIGS. 1 and 1A. Such valves can be integrated into the body of outer vessel support bracket 214 to reduce the number of connections and to reduce the piping and insulation requirements outside of container 200. Conduit 210 can be provided with trap 210A, which one skilled in the technology will appreciate is employed to create a liquid/vapor interface therein.

As noted above, while it is desirable to employ multi-functional conduits to reduce heat leak into cryogen space 208, with the present axial support structure, a plurality of conduits can still be employed if functionally necessary. A plurality of conduits can be installed parallel to conduit 210 and disposed through hollow non-metallic radial support 220A, but only one conduit can contribute substantially to the axial support structure with the other conduit(s) comprising a bend to accommodate differential thermal expansion/contraction in addition to providing traps for creating a liquid/vapor interface. For example, a delivery line for delivering liquefied gas from cryogen space 208 can be installed in addition to conduit 210.

As shown in FIG. 2 inner vessel support bracket 212 can also be designed to provide an opposite facing surface for supporting a bearing surface on one end of non-metallic radial support 220A. Similarly, outer vessel support bracket 214 can provide an opposite facing surface for supporting the bearing surface at the opposite end of non-metallic radial support 220A. In this preferred embodiment, non-metallic radial support 220A is generally tubular in shape so that conduit 210 can be disposed within the hollow center of tubular non-metallic radial support 220A. This arrangement is preferred to the prior art arrangement of FIG. 1 because it is space efficient, requires less parts, and reduces manufacturing and material costs.

Non-metallic radial support 220A can be made from a material with a lower thermal conductivity compared to the metallic structural components 210, 212, and 214, which are welded together to provide a sealed space for cryogen space 208 and evacuatable space 206. Non-metallic radial support 220A is only required to provide support in the radial direction and it is not restrained from sliding in the axial direction relative to inner vessel support bracket 212 and/or outer vessel support bracket 214. It may facilitate fabrication to hold support 220A in place while the container is being assembled and one end of support 220A can be bonded to one of support brackets 212 and 214, but in preferred embodiments the bearing surface of at least one end is allowed to slide in the axial direction relative to the opposite facing surface. Whereas, prior art support systems with rigid support members used bends in the conduits to accommodate for differential thermal expansion and contraction to reduce stresses on the support system, an advantage of the present system is that such bends are not required and conduit 210, which also acts as the rigid support member, can be straight. Since the bearing surface of at least one end of the non-metallic radial support 220A is not bonded to its respective support bracket it provides a sliding or "floating" joint that does not restrict movement of inner vessel 204 relative to outer vessel 202. That is, if conduit 210 expands or contracts, inner vessel 204 is free to move along the longitudinal axis to accommodate such expansion or contraction so there are no stresses caused by differential contraction/expansion.

The present support system allows the size of the support structure to be smaller in diameter since it does not have to accommodate bends in the conduits. As shown by the prior art support system in FIG. 1, the diameter of cylindrical member 14 must be large enough to accommodate pipes 22, 26, and 30, which each has a bend.

With reference again to FIG. 2, the opposite end of inner vessel 204 is supported by second non-metallic radial support 220B which functions in the same way as radial support 220A, except that there is no metallic tubular support extending through the center of radial support 220B. The floating feature of the support system that is disclosed above would not be possible if a rigid axial support is provided on both sides of inner vessel 204.

Like radial support 220A, the walls of cup-shaped inner support structure 222 provide an opposite facing surface for supporting one end of radial support 220B. Inner support structure 222 is attached to inner vessel 204 and projects into cryogen space 208 to increase the length of the heat transfer path through radial support 220B. Cup-shaped inner support structure 222 has a closed bottom that separates cryogen space 208 from evacuatable space 206. Cup-shaped outer support structure 224 is attached to outer vessel 202 and provides an opposite facing surface for supporting the bearing surface of the other end of radial support 220B.

Figure 3:
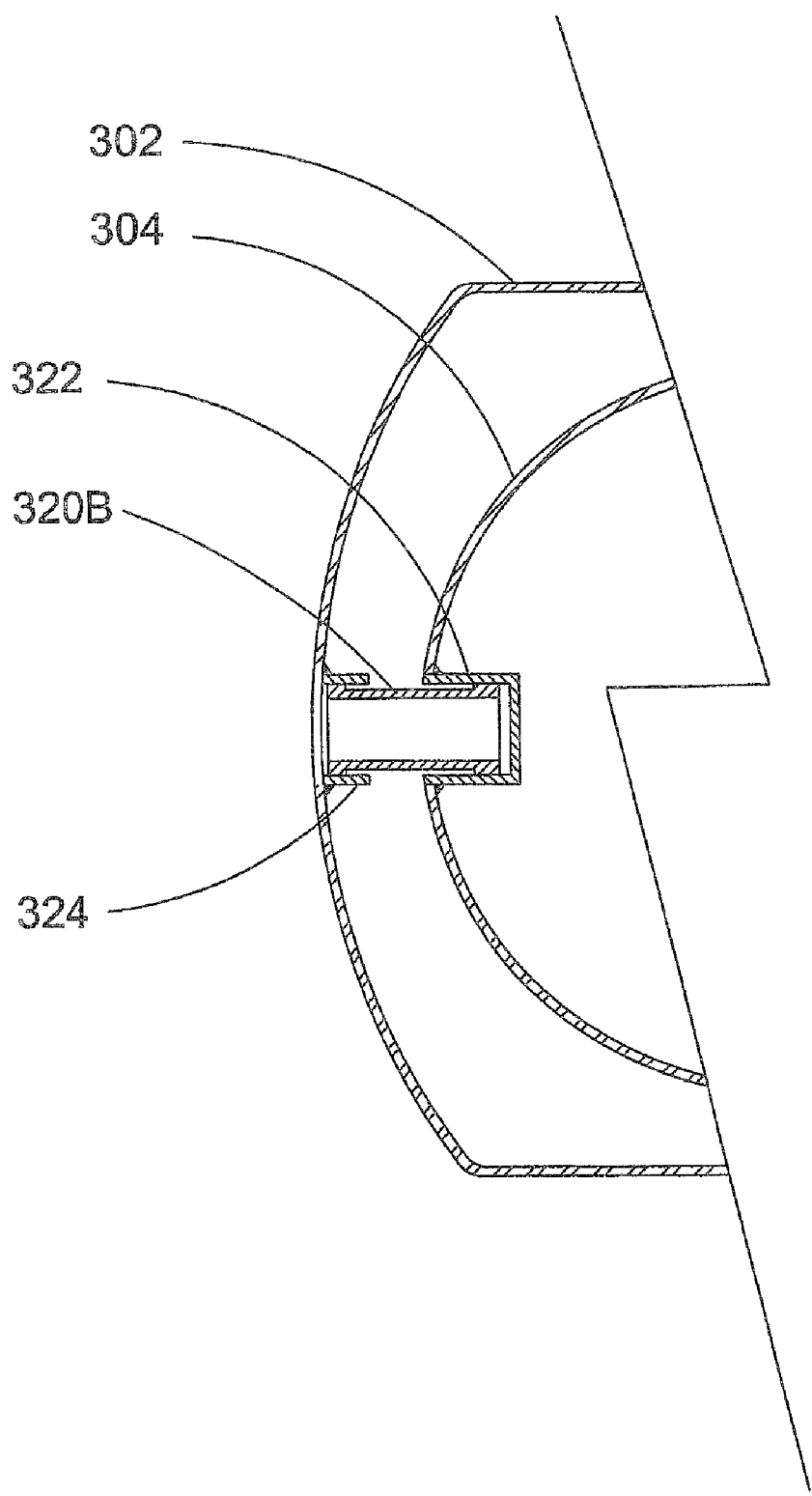
FIG. 3 shows another arrangement for the radial support using a tubular non-metallic member.

FIG. 3 shows an alternative embodiment to the radial support arrangement shown in FIG. 2. With reference to FIG. 3, outer vessel 302 can provide the bottom for support structure 324, which provides the opposite facing surface for a bearing surface of radial support 320B. Inner support structure 322 is attached to inner vessel 304 and can be substantially the same as inner support structure 222 of FIG. 2. An advantage of this arrangement for outer support structure 324 is that it reduces the number of penetrations through outer vessel 302, which facilitates manufacturing by reducing the number of steps for fabricating the container, while also providing less opportunity for leaks. This arrangement also uses less material and reduces the overall length of the container.

With respect to the embodiments of both FIGS. 2 and 3, the bottoms of the cup-shaped support structures are spaced apart from each other a distance greater than the length of respective radial supports 220B and 320B, to allow some axial movement, while also imposing limits to this movement to ensure that radial supports 220B and 320B are held in position.

By separating the axial load bearing structure from the radial load bearing structure, the cross-sectional area of the elongated metallic tubular support can be less than a conventional metallic support member that is designed to carry both axial and radial loads. With the present preferred embodiments, the load bearing structure for the radial loads can be made from a non-metallic material, so the combined thermal conductivity for the present support system can be less than a conventional all-metallic support system.

Further reductions in heat transfer into the cryogen space can be achieved by making the axial support multi-functional thereby eliminating the need for additional thermally conductive components that penetrate through the thermal insulation.

Figure 4:
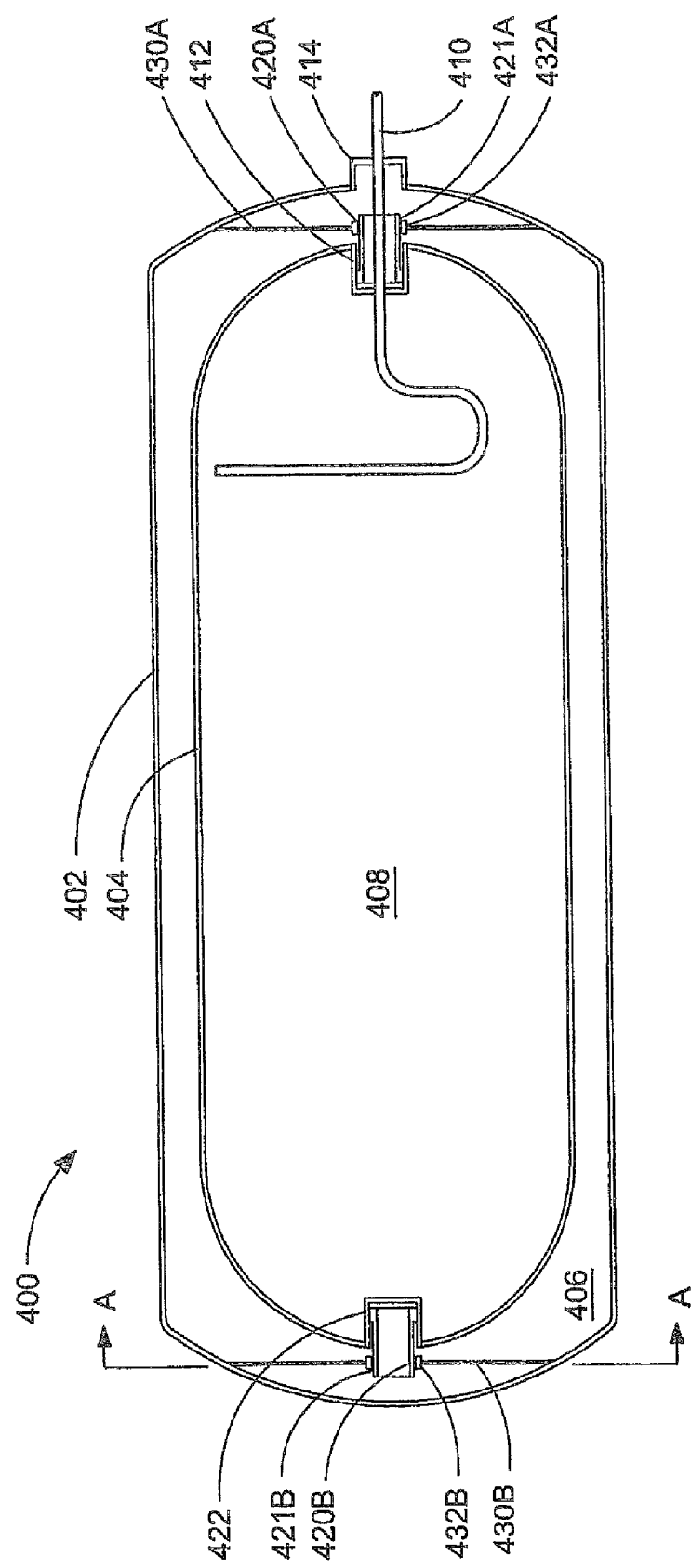
FIGS. 4, 4A and 4B show cross-sectional views of further preferred embodiments of the subject container. In these embodiments, the radial loads are transferred through cylindrical non-metallic members, which interface between support structures on opposite ends of the inner vessel and straps that extend from the non-metallic cylinders to respective points of attachment on the outer vessel.
Figure 4B:
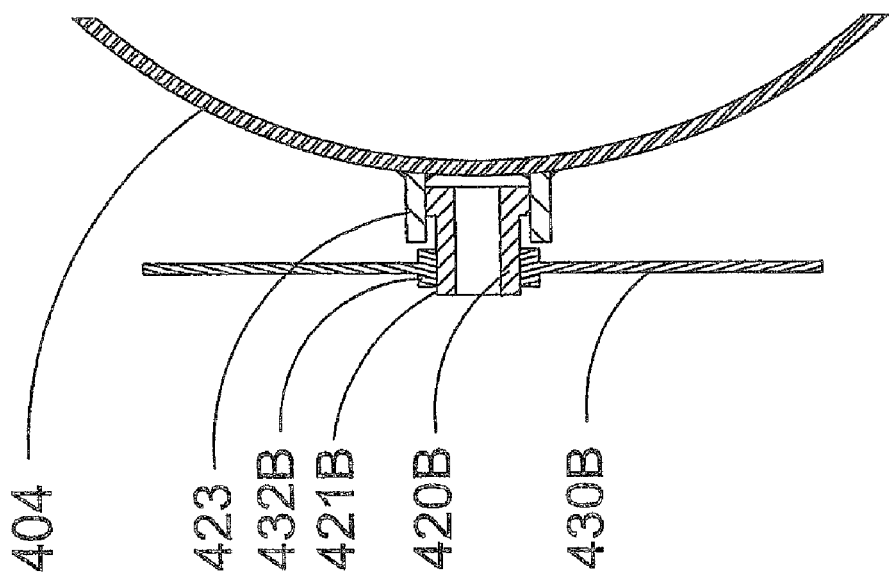
Figure 4A:
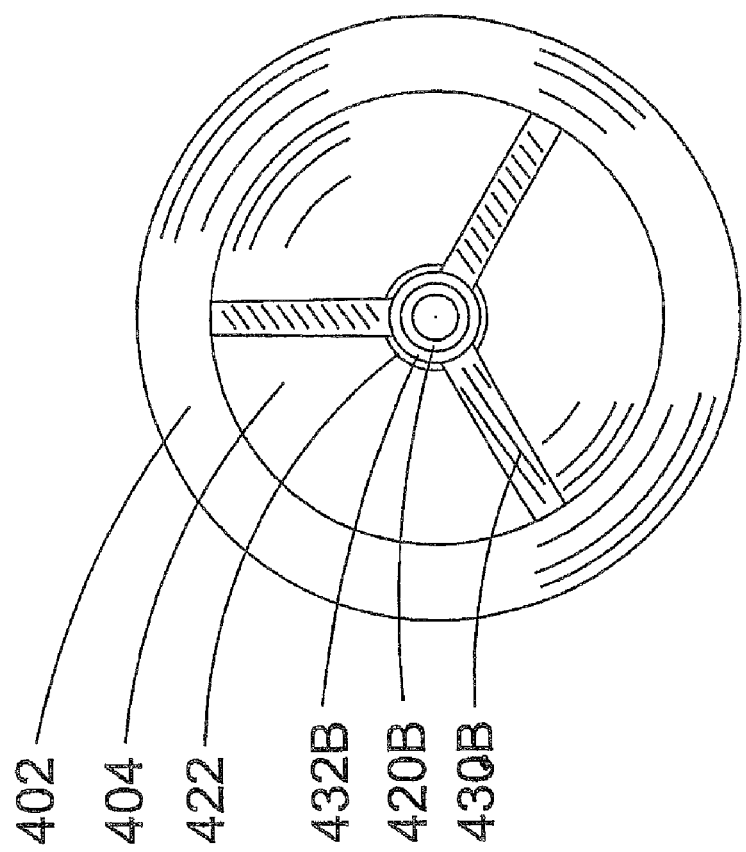

Referring now to FIGS. 4 and 4A, another embodiment is presented in the form of container 400, which comprises outer vessel 402 and inner vessel 404, defining cryogen space 408 surrounded by evacuatable space 406. Illustrated in FIGS. 4 and 4A is an example of another preferred embodiment of an improved support system for a horizontally elongated inner vessel that employs separate axial and radial support structures for improved thermal insulation compared to prior art structures.

To support inner vessel 404 in the axial direction, the structure for supporting inner vessel 404 is substantially the same as the structure for supporting inner vessel 204 of FIG. 2. The axial support structure comprises an elongated metallic tubular support that is attached at a first point to an inner vessel support bracket associated with the inner vessel and attached at a second point to an outer vessel support bracket. Conduit 410 serves as the elongated metallic tubular support. Like in the embodiment of FIG. 2, conduit 410 can be welded at a first point to inner vessel support bracket 412, as indicated in FIG. 4. Conduit 410 can also be welded at a second point to outer vessel support bracket 414. Accordingly, conduit 410 provides a rigid support member fixedly attached to both inner vessel 404 and outer vessel 402, and is sized to be capable of providing all of the axial support needed by inner vessel 404 in the direction parallel to the horizontal longitudinal axis.

As shown in FIG. 4, inner vessel support bracket 412 and outer vessel support bracket 414 are both cup-shaped with the open ends of the cups facing each other to extend the length of the heat transfer path between the first and second points where conduit 410 is attached to the respective support brackets. However, if it is desirable to make the length of container 400 more compact, in another embodiment (not shown) conduit 410 can be welded directly to outer vessel 402, resulting in a shorter heat transfer path, but a simpler structure to manufacture. With this arrangement, the wall of outer vessel 402 can be reinforced to provide the necessary strength where it is welded to conduit 210.

The embodiment of FIG. 4 employs a radial support structure that comprises straps 430A and 430B and cylindrical non-metallic radial supports 420A and 420B. Non-metallic radial supports 420A and 420B extend from respective inner vessel support brackets 412 and 422, but unlike the embodiment of FIG. 2, they do not extend as far as outer vessel 402. In the embodiment of FIG. 4, non-metallic radial supports 420A and 420B can be fixedly attached to respective inner vessel support brackets 412 and 422, for example using a threaded connection or a permanent adhesive. Respective bearing surfaces 421A and 421B allow axial movement relative to the opposite facing surface provided by the inner surface of respective collars 432A and 432B. Accordingly, like the other disclosed embodiments, in this embodiment the radial supports do not restrain movement of inner vessel 404 in the axial direction.

Straps 430A and 430B are each attached at one end to respective collars 432A and 432B and at the other end to an attachment point on outer vessel 402. If straps 430A and 430B are metallic, they can be welded to outer vessel 402 and the respective collars. If straps 430A and 430B are non-metallic, mechanical fasteners such as bolts, rivets, or pins may be employed to attach them to outer vessel 402. The collars and straps can be integrated and made as a one-piece non-metallic composite assembly.

Because of the shape of inner vessel 404 and the position of the inner vessel support brackets, which are concentric with the horizontal central longitudinal axis, straps 430A and 430B are oriented both tangentially to inner vessel 404 and perpendicular to the longitudinal axis. With this arrangement, straps 430A and 430B can be positioned to provide support in the radial direction while providing a longer heat transfer path for reducing heat leak.

FIG. 4A is a cross-section view of a radial support structure seen through section line A-A indicated in FIG. 4. In the illustrated example, the radius of outer vessel 402 is larger than the radius where straps 430B are attached. For illustrative purposes an arrangement with three straps is shown but arrangements with more straps are also possible. The number and size of straps depends on the size of inner vessel 404 and the anticipated radial loads. With more straps, the cross-sectional area of each strap can be less. Allowing for appropriate safety factors, it is desirable to reduce the collective cross-sectional area of the straps to reduce the conductive heat transfer between the inner and outer vessels. The term "strap" is used herein to describe a structural member for transferring radial loads. For example, a plurality of rods or spokes are within the scope of what is defined herein as "straps" because they can be employed in the same way to achieve the same result.

FIG. 4B is a detailed view of yet another arrangement for supporting non-metallic radial support 420B. Like features are labeled with like reference numbers. Because straps 430B already provide an extended heat transfer path, compared to the radial distance between inner vessel 404 and outer vessel 402, the inner support bracket can be provided by cylindrical ring 423, which is welded to inner vessel 404, instead of the cup-shaped structure of FIG. 4. Advantages of the arrangement of FIG. 4B compared to that of FIG. 4 include less sealed joints for inner vessel 402, less material, and potentially lower fabrication costs.

Figure 5:
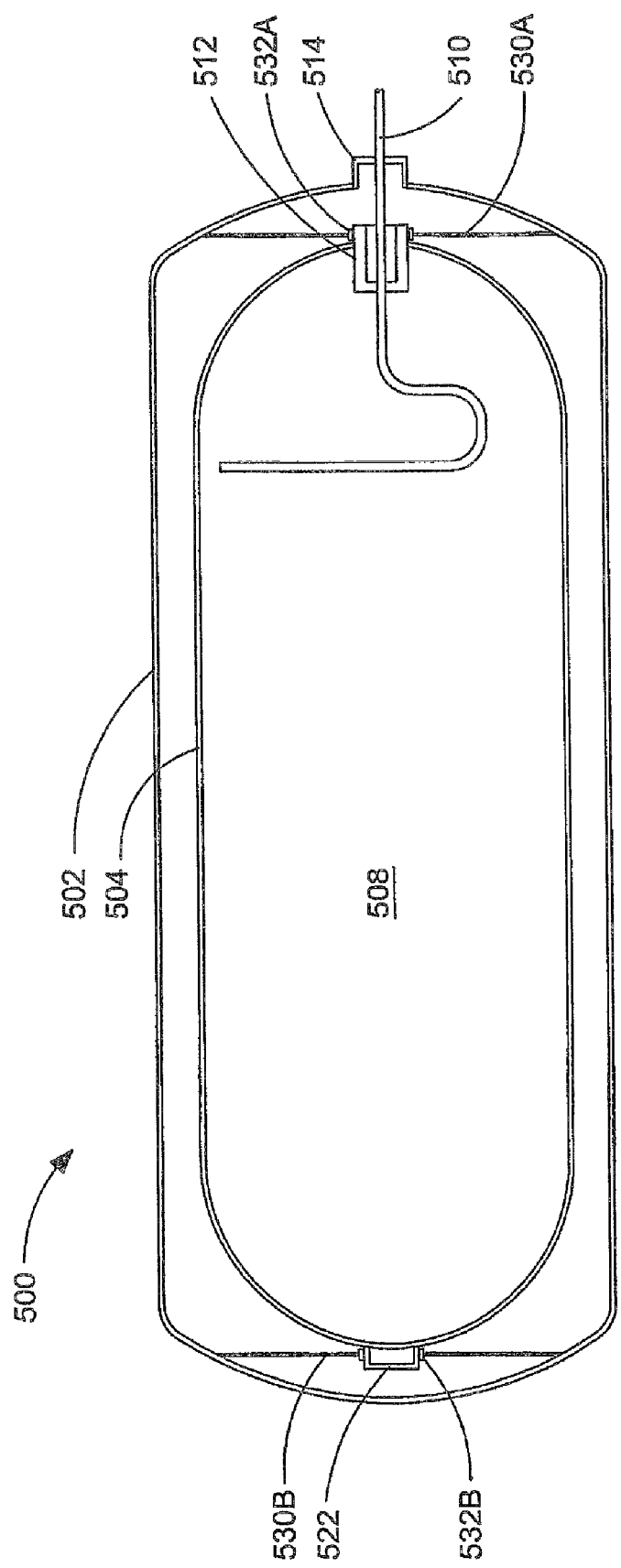
FIG. 5 shows yet another embodiment of the subject container that employs a metal hub that can be welded to the inner vessel, with non-metallic straps extending to the outer vessel from a collar disposed around the hub.

Similar to the embodiments of FIGS. 4 and 4B, FIG. 5 is a detailed view of another embodiment of a double-walled container 500, which comprises an arrangement for transferring radial loads from inner vessel 504 to outer vessel 502 through a plurality of straps. Instead of a non-metallic cylindrical member that acts as a hub and thermal barrier, this embodiment employs a metallic hub that is attached to inner vessel 504. Non-metallic straps 530A and 530B are selected to have low thermal conductivity to reduce the conductive heat transfer into cryogen space 508. Collars 532A and 532B can be metallic or non-metallic and integrated with respective straps 530A and 530B.

Like each of the other embodiments, the axial support structure can be integrated with one of the radial support structures. With reference to FIG. 5, conduit 510 provides support in the axial direction and extends between inner vessel support bracket 512 and outer vessel support bracket 514. The open edge of inner vessel support bracket 512 extends beyond the surface of inner vessel 504 to provide a metallic hub that provides an opposite facing surface for bearing surfaces associated with the radial support structure. The bearing surface for the radial support is provided by the inner surface of collar 532A, allowing axial movement of inner vessel 504 relative to collar 532A.

At the opposite end of inner vessel 504, the other radial support structure comprises metallic hub 522, which is attached to inner vessel 504, for example, by welds. The arrangement for straps 530B and collar 532B can be virtually the same as the arrangement for straps 530A and collar 532A.

Figure 6:
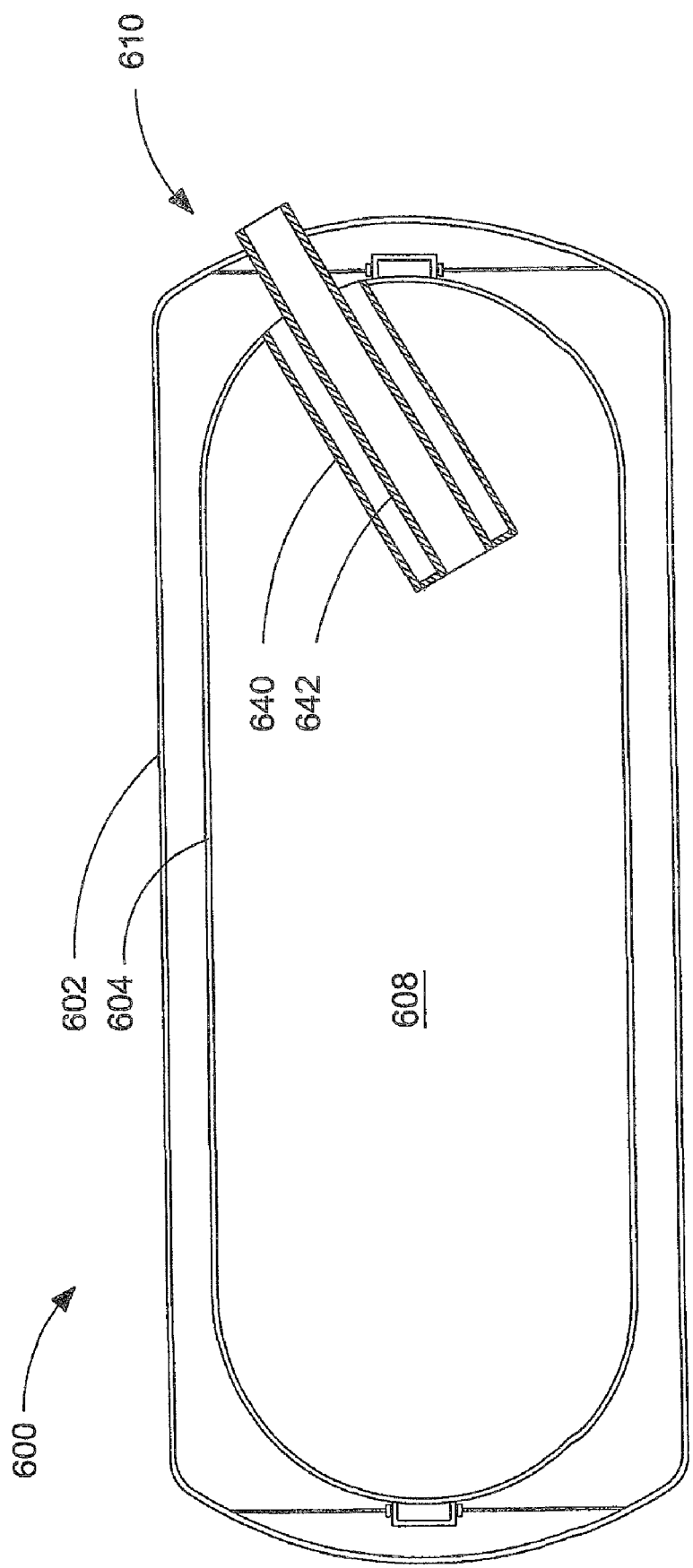
FIG. 6 shows a cross-sectional view of an embodiment of the subject container wherein the axial support is provided by a double walled structure that can also be employed as a sleeve through which an apparatus, such as a pump, can be inserted into the cryogen space.

Referring now to FIG. 6, container 600, which comprises outer vessel 602 and inner vessel 604 is an example of yet another preferred embodiment of an improved support system for a horizontally oriented inner vessel. Like the other embodiments, the container shown in FIG. 6 employs an axial support structure that is separate from a radial support structure. Whereas the axial support structure shown for each of the other embodiments is essentially the same, container 600 employs a different axial support structure. Any one or combination of the previously described radial support structures can be employed with this embodiment, and by way of example, container 600 is shown with a radial support structure that is similar to the structure shown in FIG. 5 and the description of this radial support structure will not be repeated with reference to this embodiment.

With some containers for cryogenic fluids, it is desirable to locate the inlet for a pump or a level sensor inside cryogen space 608. The embodiment of FIG. 6 illustrates a container with double-walled sleeve 610 into which a pump or instrumentation can be disposed. Double-walled sleeve 610 also acts to provide support in the axial direction.

To extend the heat transfer path through sleeve 610, a double-walled construction is employed whereby outer wall 640 is attached to inner vessel 604 and inner wall 642 is attached to outer vessel 602. According to this arrangement the heat transfer path from cryogen space 608 to outer vessel 602 is at least as long as inner wall 642. The space between outer wall 640 and inner wall 642 is open to evacuatable space 606 to limit heat transfer between cryogen space 608 and inner wall 642 and the apparatus that is inserted within sleeve 610.

Common to all of the embodiments is a container supported along a horizontal axis with separate support structures for transmitting radial and axial loads. The axial loads are carried by an elongated metallic tubular support that can also serve as a conduit or a sleeve for supporting a pump or, instrumentation such as a level sensor. This dual functionality of the metallic tubular support is an additional benefit of the disclosed support system because it reduces the need for a separate pipe that would act as another heat transfer path.

Unlike a container intended for a stationary installation, a container designed for mounting on a vehicle must be designed to carry loads in all directions. Accordingly, conventional support systems such as the one shown in FIG. 1, when designed for mounting on a vehicle, require a much heavier metallic cylindrical support member 114, compared to each of the presently disclosed arrangements because the present elongated metallic tubular support is only required to transmit axial loads.

Figure 1:
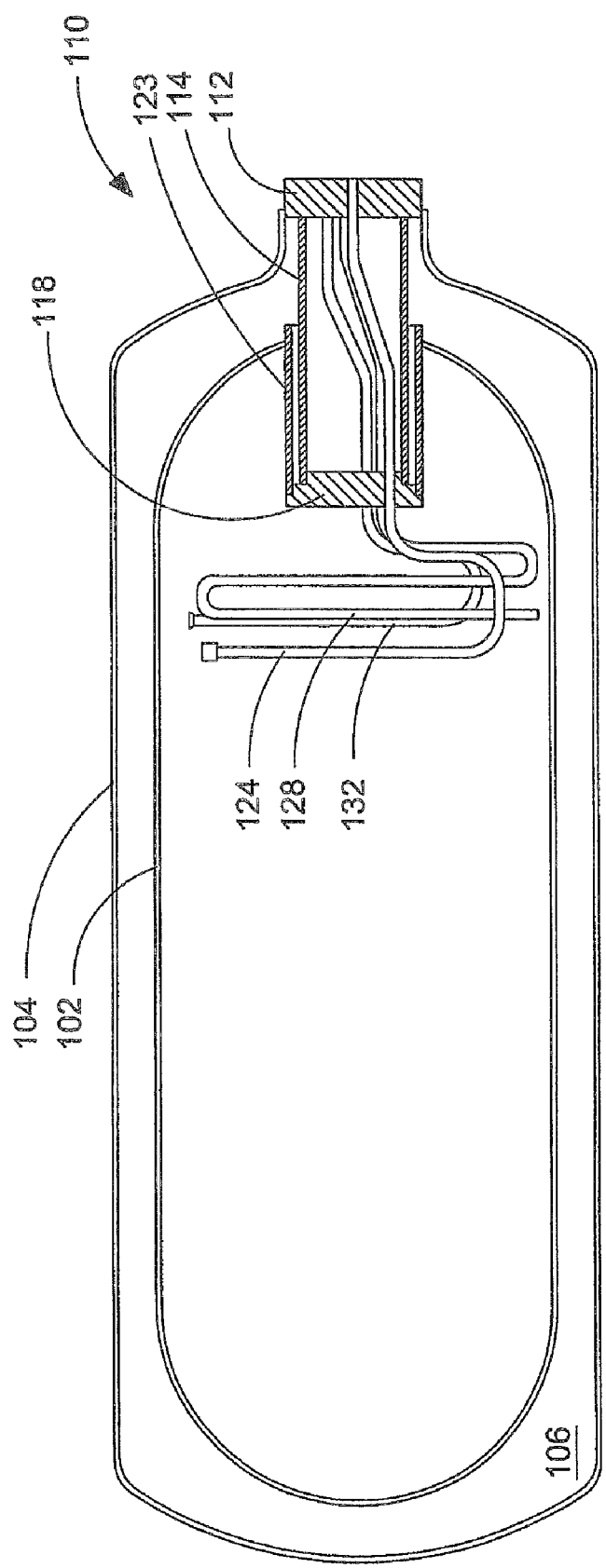
FIGS. 1 and 1A, marked "Prior Art", show a support system for cryogenic vessels that is representative of the current state of the art.
Figure 1A:
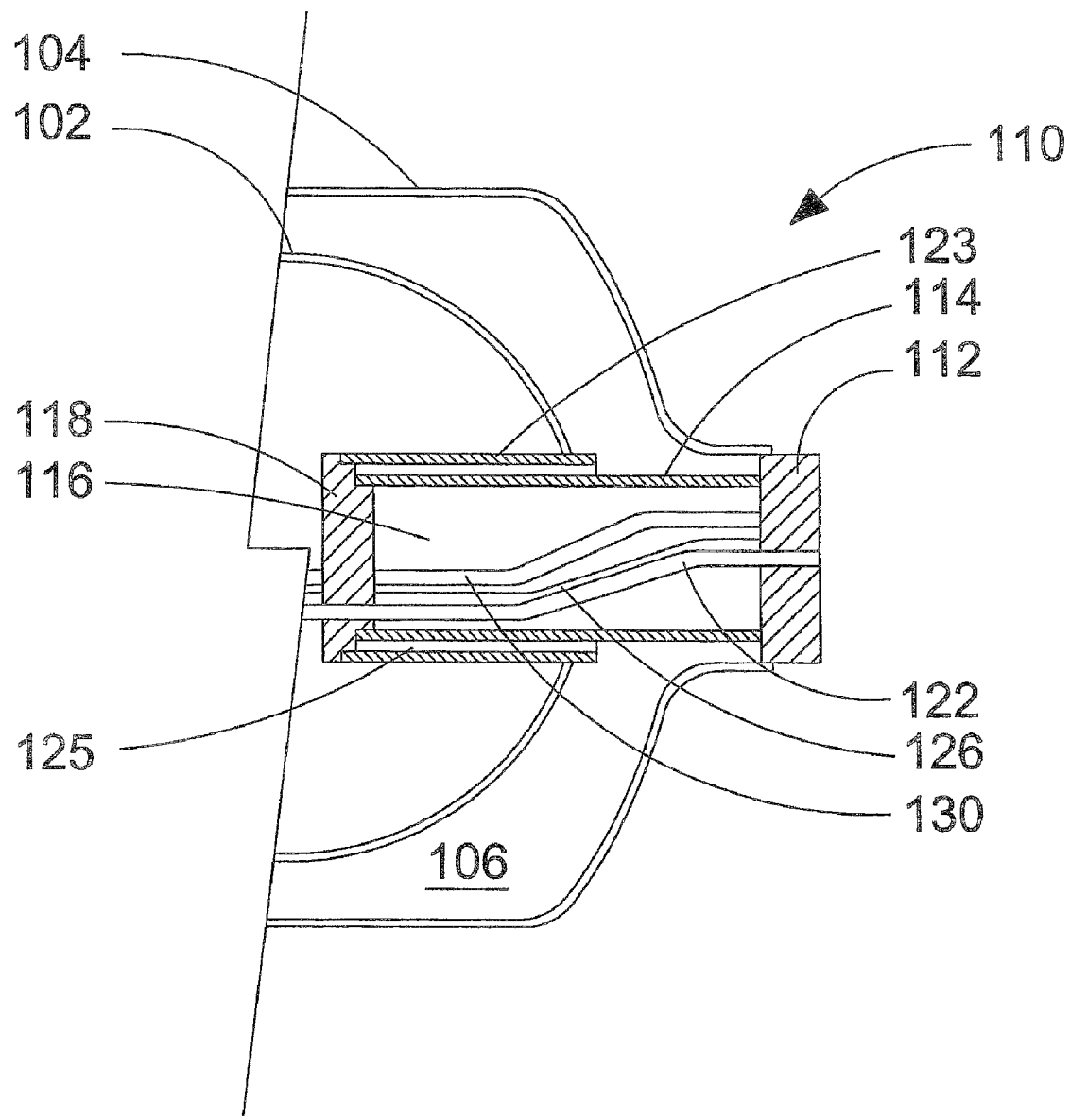

In all embodiments, the radial loads, which can be significant for vehicle-mounted containers, are transmitted by non-metallic radial supports that have a much lower thermal conductivity compared to the metallic cylindrical support member of FIG. 1.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. A container for holding a cryogenic fluid, said container comprising:
   (a) an inner vessel defining a cryogen space and having a horizontal axis;
   (b) an outer vessel surrounding said inner vessel, defining an evacuatable space between said outer vessel and said inner vessel;
   (c) a structure for supporting said inner vessel within said outer vessel, said structure comprising:
      an elongated metallic tubular support defining a passage into said cryogen space from outside of said outer vessel, wherein said elongated metallic tubular support is attached at a first point to an inner vessel support bracket associated with said inner vessel, and attached at a second point to an outer vessel support bracket for said outer vessel, said metallic tubular support supporting substantially all loads acting on said inner vessel in a direction parallel to said horizontal axis; and
      a plurality of non-metallic radial supports spanning between said inner vessel and said outer vessel, each one of said radial supports providing a bearing surface associated with respective opposite facing surfaces associated with said inner vessel and said outer vessel for transferring radial loads transverse to said horizontal axis from said inner vessel to said outer vessel, wherein said bearing surface allows movement in the direction parallel to said horizontal axis.

2. The container of claim 1 wherein said plurality of non-metallic radial supports comprises:

a first non-metallic radial support associated with a first side of said inner vessel that is intersected by said horizontal axis, said first non-metallic radial support having bearing surfaces; and a second non-metallic radial support associated with a second side of said inner vessel, opposite to said first side.

3. The container of claim 2 wherein:

said opposite facing surfaces associated with said first and second sides of said inner vessel are provided by walls of respective cup-shaped inner support structures projecting into said cryogen space;

said opposite facing surfaces associated with said outer vessel are provided by walls of opposite cup-shaped outer support structures projecting from said outer vessel and aligned with said cup-shaped inner support structures; and said first and second non-metallic radial supports each comprise a cylindrical member with a first end disposed in a respective one of said cup-shaped inner support structures and a second end disposed in a respective one of said cup-shaped outer vessel support structures.

4. The container of claim 3 wherein said cylindrical member is hollow so that it is tubular in shape.

5. The container of claim 4 wherein said elongated metallic tubular support extends through said cylindrical member.

6. The container of claim 5 wherein said inner vessel support bracket is integrated with said cup-shaped inner support structure.

7. The container of claim 5 wherein said outer vessel support bracket is integrated with said cup-shaped outer support structure.

8. The container of claim 1 wherein said plurality of non-metallic radial supports comprises members made from a composite material comprising fibers disposed within a plastic matrix.

9. The container of claim 8 wherein said fibers are selected from the group consisting of glass, carbon, synthetic fibers made from a resin, and quartz.

10. The container of claim 8 wherein said plastic matrix is provided by an epoxy resin.

11. The container of claim 10 wherein said epoxy resin has a cure temperature that is greater than 175° C.

12. The container of claim 8 wherein said plastic matrix comprises bismaleimide.

13. The container of claim 8 wherein said plastic matrix comprises a thermoplastic selected from the group consisting of polyetheretherketone and polyphenylene sulfide.

14. The container of claim 8 wherein said composite material has a TMV less than 1%.

15. The container of claim 8 wherein said composite material has a CVCM less than 0.1%.

16. The container of claim 1 wherein said elongated metallic tubular support has a length between said first and second points that provides a heat path between said inner vessel and said outer vessel that is longer than the radial spacing between said inner vessel and said outer vessel.

17. The container of claim 1 wherein said plurality of non-metallic radial supports have a collective thermal conductivity less than a substitute radial support made from a ferrous material with at least the same structural strength.

18. The container of claim 2 wherein said first and second non-metallic radial supports each comprise a hub that provides said bearing surfaces that cooperate with said respective opposite facing surfaces associated with said first and second sides of said inner vessel and a plurality of straps extend from said hub to respective attachment points located on the interior surface of said outer vessel.

19. The container of claim 18 wherein said straps extend in a direction that provides radial support to said inner vessel while providing a heat transfer path between said inner vessel and said outer vessel that is longer than the radial spacing between said inner vessel and said outer vessel where said horizontal axis intersects said inner and outer vessels.

20. The container of claim 19 wherein said straps extend in a direction that is substantially tangential to the surface of said inner vessel.

21. The container of claim 19 wherein said straps extend in a direction that is substantially perpendicular to said horizontal axis.

22. The container of claim 18 wherein said hub has a hollow axis and said elongated metallic tubular support extends through said hollow axis.

23. The container of claim 18 wherein said straps are metallic.

24. The container of claim 23 wherein at least one of said straps has an end that is welded to said outer vessel at a respective one of said attachment points.

25. The container of claim 23 wherein at least one of said straps is attached to a collar that is disposed around said hub.

26. The container of claim 18 wherein said straps are non-metallic.

27. The container of claim 26 wherein at least one of said straps has an end that is bolted to said outer vessel at a respective one of said attachment points.

28. The container of claim 26 wherein at least one of said straps is attached to a collar that is disposed around said hub.

29. The container of claim 2 wherein said first and second non-metallic radial supports comprise a plurality of straps and said bearing surfaces of said first and second non-metallic radial supports are provided by respective collars that cooperates with respective opposite facing surfaces that are associated with said inner vessel, each one of said plurality of straps having one end attached to said collar and another end attached to said outer vessel.

30. The container of claim 1 wherein said elongated metallic tubular support serves as a conduit through which cryogenic fluid can flow into or out of said cryogen space.

31. The container of claim 30 wherein said conduit terminates with an open end near the top of said cryogen space so that said conduit is usable to fill or vent said cryogen space.

32. The container of claim 1 wherein said elongated metallic tubular support supports a level sensor or provides a passage for wiring connected to instrumentation disposed within said cryogen space.

33. The container of claim 1 wherein said elongated metallic tubular support is also a sleeve for supporting a pump, which has an inlet disposed within said cryogen space.

34. The container of claim 33 wherein said elongated metallic tubular support is double walled and comprises:

an inner tubular wall spaced apart from an outer tubular wall wherein the space between said inner and outer tubular walls is evacuatable together with said evacuatable space between said outer vessel and said inner vessel;

a distal end disposed within said inner vessel with said inner and outer tubular walls joined together and sealed at or near said distal end whereby cryogenic fluid from within said cryogen space is prevented from flowing into the space between said outer and inner tubular walls; and a proximal end associated with said inner vessel and said outer vessel, whereby said inner tubular wall is structurally attached to said inner vessel and said outer tubular wall is structurally attached to said outer vessel.

35. The container of claim 1 wherein said inner vessel has a substantially cylindrical shape with domed ends and the longitudinal axis of said cylinder is aligned with said horizontal axis.

36. The container of claim 1 wherein said container is mountable on a vehicle and operable as a fuel tank.

37. A container for holding a cryogenic fluid, said container comprising:
  (a) an inner vessel defining a cryogen space and having a horizontal axis;
  (b) an outer vessel surrounding said inner vessel, defining an evacuatable space between said outer vessel and said inner vessel;
  (c) a structure for supporting said inner vessel, said structure comprising:
    (i) an elongated metallic double walled tubular support defining a passage into said cryogen space from outside of said outer vessel, wherein said elongated metallic double walled tubular support carrying substantially all loads acting in a direction parallel to said horizontal axis between said inner vessel and said outer vessel, said elongated metallic double walled tubular support comprising:
      an inner wall spaced apart from an outer wall wherein the space between said inner and outer walls is evacuatable together with said evacuatable space between said outer vessel and said inner vessel;
      a distal end disposed within said inner vessel with said inner and outer walls joined together and sealed at or near said distal end whereby cryogenic fluid from within said cryogen space is prevented from flowing into the space between said outer and inner walls;
      a proximal end associated with said inner vessel and said outer vessel, whereby said inner wall is structurally attached to said inner vessel and said outer wall is structurally attached to said outer vessel; and
    (ii) first and second radial supports associated with opposite first and second sides of said inner vessel, said opposite first and second sides being intersected by said horizontal axis, said radial supports carrying substantially all loads acting in a radial direction in relation to said horizontal axis, each one of said first and second radial supports comprising at least one non-metallic member extending between said inner vessel and said outer vessel.

38. The container of claim 37 wherein said inner vessel is elongated in a direction parallel to said horizontal axis.

39. The container of claim 37 wherein said non-metallic member has a thermal conductivity less than a substitute radial support member made from a ferrous material with at least the same structural strength.

40. The container of claim 37 wherein said non-metallic member is an elongated tube having first and second load bearing surfaces, said first load bearing surface associated with a first opposite facing surface associated with said inner vessel, and said second load bearing surface associated with a second opposite facing surface associated with said outer vessel.

41. The container of claim 40 further comprising a conduit disposed through said non-metallic elongated tube through which fluid may flow from or to outside said container, into or out of said cryogen space respectively, wherein said conduit further comprises an outside diameter smaller than the inside diameter of said elongated tube such that said conduit is spaced apart from said elongated tube.

* * * * *